United States Patent [19]

Takagi

[11] Patent Number: 5,655,057
[45] Date of Patent: Aug. 5, 1997

[54] SPEECH RECOGNITION APPARATUS

[75] Inventor: Keizaburo Takagi, Tokyo, Japan

[73] Assignee: NEC Corporation, Tokyo, Japan

[21] Appl. No.: 361,567

[22] Filed: Dec. 22, 1994

[30] Foreign Application Priority Data

Dec. 27, 1993 [JP] Japan ................................ 5-331478

[51] Int. Cl.$^6$ ............................................ G10L 9/00
[52] U.S. Cl. ...................... 395/2.42; 395/2.35; 395/2.61
[58] Field of Search ............................... 395/2.42, 2.44,
395/2.61, 2.56, 2.62, 2.43, 2.5, 2.35; 381/47,
43

[56] References Cited

U.S. PATENT DOCUMENTS

| 4,256,924 | 3/1981 | Sakoe | 395/2.5 |
|---|---|---|---|
| 4,403,114 | 9/1983 | Sakoe | 381/42 |
| 4,624,010 | 11/1986 | Takebayashi | 381/43 |
| 4,918,735 | 4/1990 | Morito et al. | 381/47 |
| 5,189,727 | 2/1993 | Guerreri | 395/2 |
| 5,201,004 | 4/1993 | Fujiwara et al. | 381/46 |
| 5,359,695 | 10/1994 | Ohora et al. | 395/2.44 |
| 5,390,280 | 2/1995 | Kato | 395/2.42 |

FOREIGN PATENT DOCUMENTS

| 0 421 744 | 4/1991 | European Pat. Off. . |
| 0 523 347 | 1/1993 | European Pat. Off. . |

OTHER PUBLICATIONS

Crozier et al. ("Speech enhancement employing subtraction and linear predictive analysis", Electronics' Letters, vol.29, Issue 12, pp. 1094–1095, Jun. 10 1993).

Vaseghi et al. ("Noisy Speech Recognition using Cepstral–Time Features and Spectral–Time Filters", ICASSP'94: Acoustics, Speech & Signal Conference, vol. II, pp. 65–68, 1994).

Primary Examiner—Allen R. MacDonald
Assistant Examiner—Vijay B. Chawan
Attorney, Agent, or Firm—Foley & Lardner

[57] ABSTRACT

A speech recognition apparatus includes an average vector calculating portion 5, a compensating portion 6, and a matching portion 8. The average vector calculating portion 5 calculates an average vector for each of the noise region and the speech region of the input speech and those of a reference pattern received from a spectrum converting portion 4 corresponding to matching information received from a preliminary matching portion 2. The compensating portion 6 compensates the average vectors calculated by the average vector calculating portion 5 for at least one of the time sequence of the spectra of the input speech and the time sequence of the spectra of the reference pattern so that the average vector of the time sequence of the spectra of the noise region of the input speech matches with the average vector of the time sequence of the spectra of the noise region of the reference pattern, and that the average vector of the time sequence of the spectra of the speech region of the input speech matches with the average vector of the time sequence of the spectra of the speech region of the reference pattern. The matching portion 8 finally matches the reference pattern with the input speech and outputs a recognition result.

15 Claims, 2 Drawing Sheets

SPEECH RECOGNITION APPARATUS

BACKGROUND OF THE INVENTION

1. Field of the Invention

The present invention relates to a speech recognition apparatus, in particular, to technologies for equalizing environmental differences between an input speech and a reference pattern so as to improve environmental capability.

2. Description of the Related Art

It is known that when speech is recognized, if a speech generating environment of input speech is different from that of a reference pattern speech, the speech recognition ratio is deteriorated. Among major factors that deteriorate speech recognition ratios, there are additive noise and channel distortion. The former is for example a background noise, which mixes with the speech of a speaker and is additive in the spectra domain. The latter is channel distortion directly for example transmission characteristics of microphones, telephone lines, and so forth, and for which multiplicatively distort on a spectrum.

A technique that suppresses an additive noise such as background noise that is mixed with speech is known. This technique is known as spectral subtraction that is described in for example "Suppression of Acoustic Noise in Speech Using Spectral Subtraction", by S. F. Boll, IEEE Trans. on ASSP, Vol. ASSP-27, No. 2, 1979 (hereinafter referred to as reference [1]). A speech recognition apparatus using the spectral subtraction technique is constructed for example as shown in FIG. 2.

Figure 2:
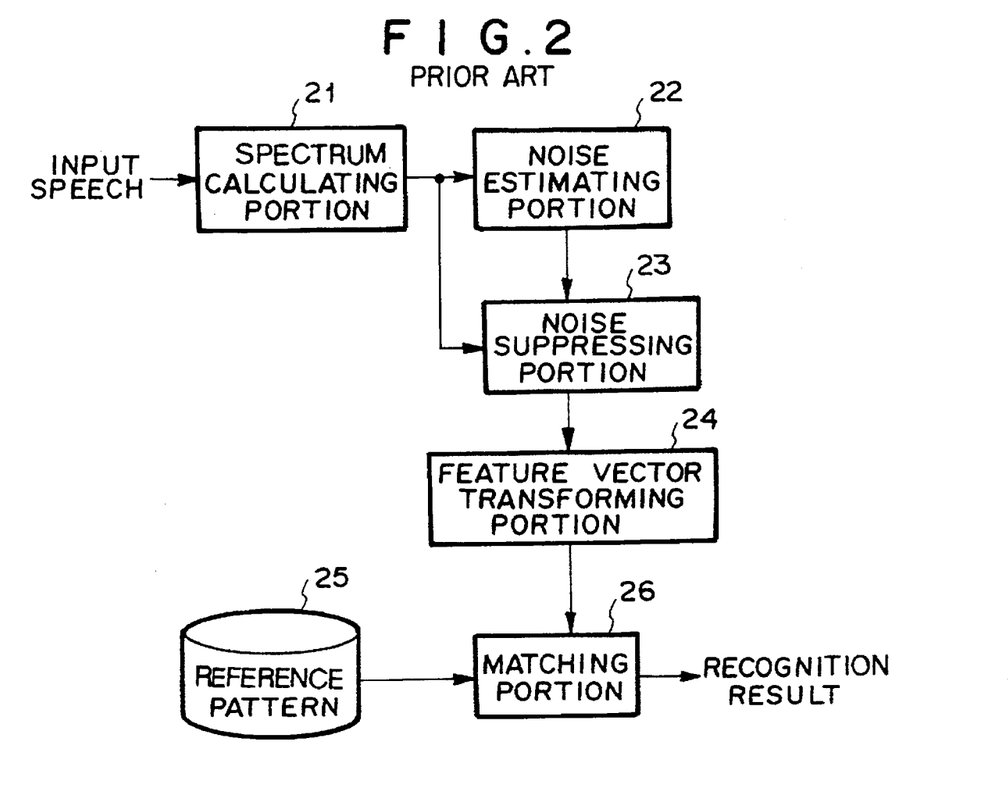
FIG. 2 is a block diagram showing a conventional speech recognition apparatus using spectral subtraction technique.

In FIG. 2, reference numeral 21 is a spectrum calculating portion. Input speech that is mixed with noise is sent to the spectrum calculating portion 21. The spectrum calculating portion 21 transforms the input speech into a time sequence of spectra. Reference numeral 22 is a noise estimating portion that estimates the spectrum of the noise component that is mixed with the time sequence of the spectra Of the input speech signal using only noise spectra (that does not contain speech in the input speech signal). Reference numeral 23 is a noise suppressing portion that subtracts the spectrum of the noise, which is estimated by the noise estimating portion 22, from the entire time sequence of the spectra of the input speech signal, which is obtained by the spectral calculating portion 21. Reference numeral 24 is a feature vector transforming portion that transforms the time sequence of the spectra of the speech, in which the noise is suppressed by the noise suppressing portion 23, into a time sequence of feature vectors that is used for recognizing the speech.

Reference numeral 26 is a matching portion that calculates the similarity between a time sequence of feature vectors of speech of a standard speaker that does not contain noise and the time sequence of the feature vectors of the input speech corresponding to a technique that obtains a time-alignment and calculates similarity such as DP matching technique or HMM (Hidden Markov Modelling) technique and outputs as a recognition result a dictionary alternative with the highest similarity. Such a speech recognition apparatus can precisely suppresses the additive noise and provides high recognition ratio even if noise component varies every input speech.

Figure 3:
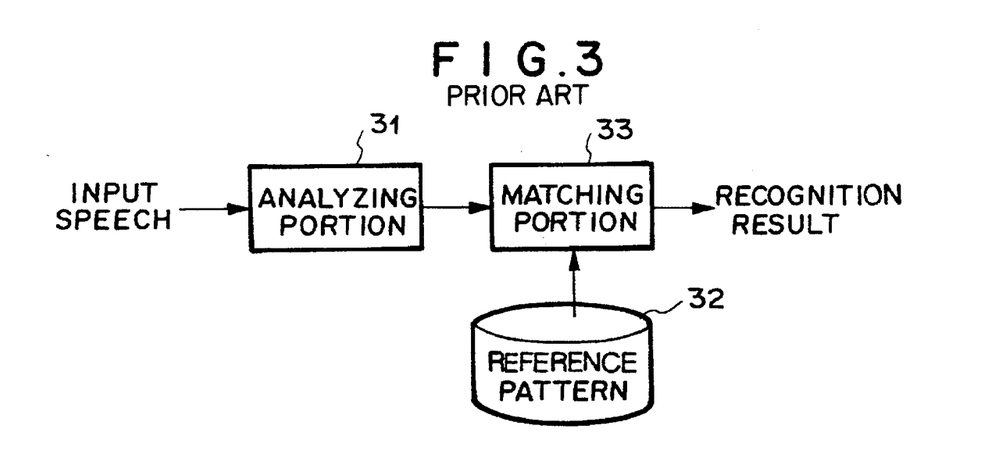
FIG. 3 is a block diagram showing a conventional speech recognition apparatus using a reference pattern that has been trained on speech of a standard speaker with the same channel distortion as that of recognized speech.

In addition, to prevent the recognition ratio from lowering due to the channel distortion, a construction as shown in FIG. 3 is known. In FIG. 3, reference numeral 32 is a reference pattern. The reference pattern 32 is formed in the following manner. Speech of a standard speaker is collected by a microphone with the same characteristics as a microphone that has collected input speech. The speech collected by the microphone is passed through a channel with the same characteristics as a channel through which the input speech has been passed. The resultant speech is analyzed in the same process as an analyzing portion 31 does. The analyzed speech is registered. The analyzing portion 31 transforms the input speech into a time sequence of feature vectors.

Reference numeral 33 is a matching portion that calculates the similarity between the time sequence of the feature vectors of the speech of the standard speaker registered in the reference pattern 32 and the time sequence of the feature vectors of the input speech corresponding to the technique that obtains the time-alignment and calculates the similarity and outputs as a recognition result a dictionary alternative with the highest similarity. When such a speech recognition apparatus is constructed, in the case that the microphone and the signal transmission line are known when speech is recognized and they can be used for collecting the training speech, the channel distortion due to the characteristics of the microphone and the transmission characteristics of the channel of the reference pattern can be matched with those of the input speech. Thus, the speech recognition apparatus can precisely recognize speech without influence by the channel distortion.

With the construction shown in FIG. 3, a speech recognition apparatus that deals with the additive noise can be provided. In this case, the reference pattern 32 is collected a speech in an environment where the background noise of the speech of the standard speaker matches with the background noise of the input speech and is registered the feature vectors by the same method of which the input speech is analyzed in the same process as the analyzing portion 31. When the background noise that takes place in recognizing speech is known and can be used for collecting the training speech, since the additive noise of the reference pattern can be matched with that of the input sound, the speech recognition apparatus can precisely recognize speech without influenced by the additive noise.

In addition, when the reference pattern 25 used in the speech recognition apparatus using the conventional spectral subtraction technique shown in FIG. 2 is substituted with the reference pattern 32 where the channel distortion of the reference pattern 32 is matched with that of the input speech, a speech recognition apparatus that deals with both the additive noise and the channel distortion can be provided.

However, the conventional speech recognition apparatus using the spectral subtraction technique has not dealt with the channel distortion due to the microphone and the channel transmission characteristics at all. Thus, when the channel distortion of the input speech is different from that of the speech of the reference pattern, the speech recognition ratio is seriously degraded.

In the speech recognition apparatus in which the channel distortion of the reference pattern is matched with that of the input speech, the speech of the standard speaker should be collected through a microphone and a transmission line that have the same characteristics as those of a microphone and a transmission line through which the input speech is collected. However, when speech through a telephone is recognized, the microphone and the transmission line in use vary for each input speech. In addition, the microphone and the transmission through which each input speech is collected are unpredictable. Thus, with such a microphone and a transmission line, it is impossible to collect training speech and generate a reference pattern. Thus, such a speech recognition apparatus cannot be provided. This problem has not been solved by the speech recognition apparatus in which the additive noise of the reference pattern is matched with that of the additive noise of the input speech.

In addition, when the reference pattern 25 of the speech recognition apparatus using the spectral subtraction technique is substituted with the reference pattern 32 in which the reference pattern of the channel distortion is matched with that of the input speech, if the channel distortion is unknown in training speech, such a problem is not solved.

SUMMARY OF THE INVENTION

The present invention is made from the above-described point of view. An object of the present invention is to provide a speech recognition apparatus for quickly adapting additive noises and noise conditions of channel distortion of input speech with those of a reference pattern so as to precisely recognize speech even if the additive noise and channel distortion are not known in advance and they vary for each input speech.

A first aspect of the present invention is a speech recognition apparatus, comprising an analyzing portion for transforming input speech into a time sequence of feature vectors, a reference pattern stored as a noise region and a speech region of training speech that have been transformed into time sequences of feature vectors, a preliminary matching portion for matching the time sequence of the feature vectors of the input speech received from the analyzing portion with the time sequence of the feature vectors of the reference pattern and for outputting matching information, a spectral transforming portion for transforming the time sequences of the feature vectors of the input speech and the reference pattern into time sequence of respective spectra, an average vector calculating portion for calculating an average vector for each of the noise region and the speech region of the input speech and the reference pattern corresponding to the matching information received from the preliminary matching portion, a compensating portion for compensating the average vectors calculated by the average vector calculating portion for at least one of the time sequence of the spectra of the input speech and the time sequence of the spectra of the reference pattern so that the average vector of the time sequence of the spectra of the noise region of the input speech matches with the average vector of the time sequence of the spectra of the noise region of the reference pattern and that the average vector of the time sequence of the spectra of the speech region of the input speech matches with the average vector of the time sequence of the spectra of the speech region of the reference pattern, a feature vector transforming portion for transforming the time sequences of the spectra of the input speech and the reference pattern, which have been compensated by the compensating portion, into time sequences of feature vectors to be recognized, and a matching portion for finally matching the reference pattern with the input speech using the feature vectors-to-be-recognized of the input speech and the reference pattern received from the feature vector transforming portion.

A second aspect of the present invention is the speech recognition apparatus corresponding to the first aspect, wherein the compensating portion is adapted for substituting one of the time sequences of the spectra corresponding to the noise region of the average vectors calculated by the average vector calculating portion with an average vector Ni of the other noise region, subtracting an average vector Nt of one noise region from time sequences of spectra corresponding to speech regions, multiplying the result by $(Si-Ni)/(St-Nt)$ (where / is a division for each channel of the spectra, Si is an average vector of the other speech region, and St is an average vector of one speech region), and adding the result with Ni.

According to the present invention, since the additive noise and noise conditions of the channel distortion of the input speech is quickly matched with those of the reference pattern, even if the additive noise and the microphone and the transmission channel through which the input speech has been collected are unknown when the input speech is trained and they vary for each input speech, a speech recognition apparatus that can precisely recognize speech can be provided. The speech recognition apparatus can supplement the drawbacks that the conventional speech recognition apparatuses have had.

These and other objects, features and advantages of the present invention will become more apparent in light of the following detailed description of best mode embodiments thereof, as illustrated in the accompanying drawings.

DESCRIPTION OF PREFERRED EMBODIMENTS

Before explaining embodiments of the present invention, the theory of operation of the present invention will be described.

Figure 1:
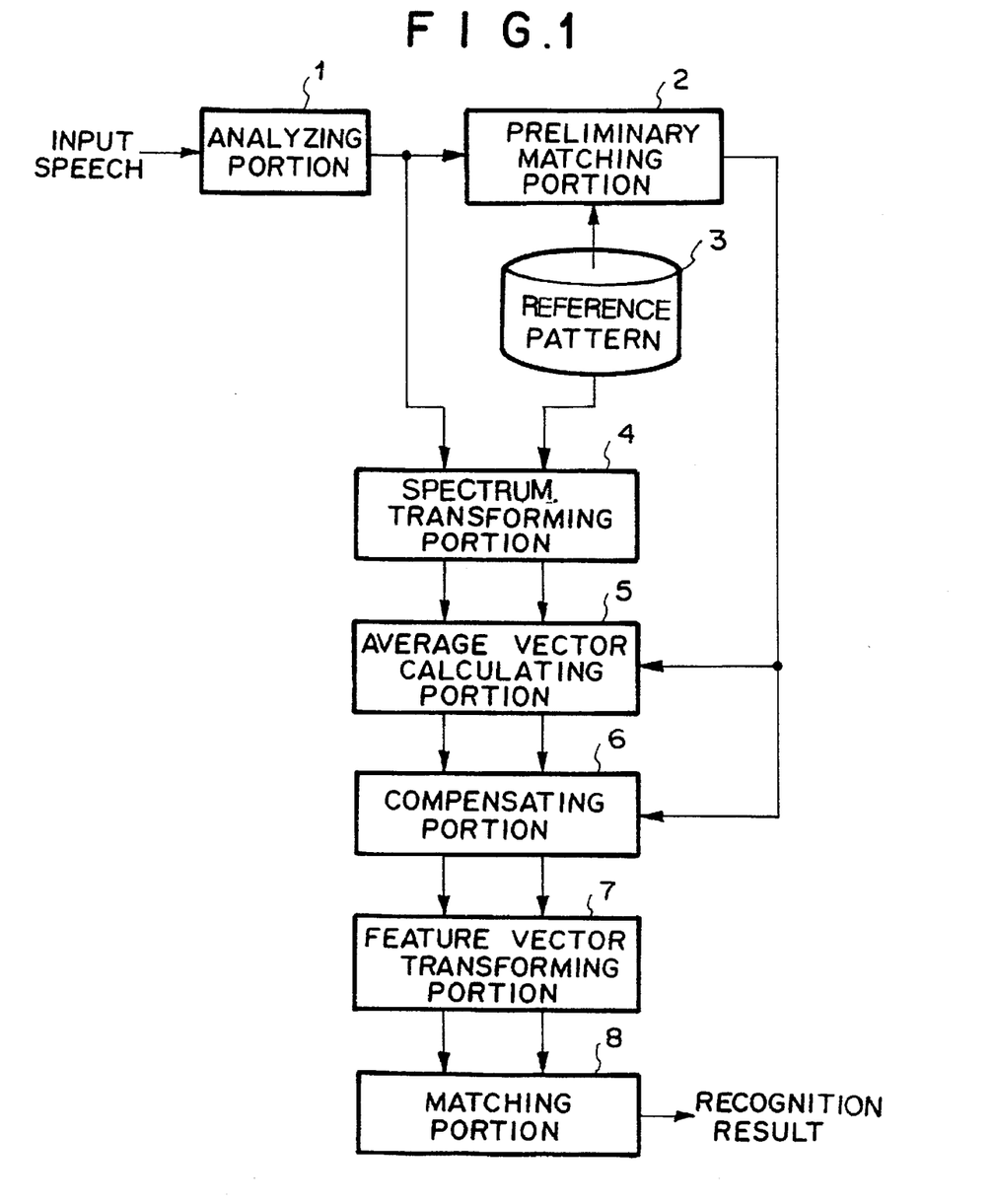
FIG. 1 is a block diagram showing a speech recognition apparatus according to a first embodiment of the present invention.

First of all, with reference to FIG. 1, the theory of operation of a speech recognition apparatus according to a first aspect of the present invention will be described. In FIG. 1, reference numeral 1 is an analyzing portion that receives input speech which contains additive noise and channel distortion. The analyzing portion 1 transforms the input speech into a time sequence of feature vectors. A variety of feature factors such as an output of a band filter group of several channels and an analysis by self correlation function are known as described in "Digital Speech Processing (translated title)" by Furui, Tokai Univ. Press, pp. 154–160, 1985 (reference [2]). In the following description, a cepstrum that is obtained by LPC (Linear Predictive Coding) analysis, FFT (First Fourier Transformer) analysis, or the like is used. The cepstrum is an inverse Fourier transformation of the logarithm of a spectrum $|X(\omega)|$ of a short time amplitude of a waveform.

However, since the method for obtaining the cepstrum does not relate to the present invention, it is not explained here. A time sequence of the obtained cepstrum is denoted by X(t) (where t is a discrete time). The input speech is analyzed in such a manner that a speech portion is surrounded by non-speech portions that contain only surrounding noise. This is because it is difficult to precisely sample the leading edge and the trailing edge of the speech and thereby a consonant at the leading edge may be lost.

Thus, conventionally, the speech that is slightly longer than the sampled leading edge is analyzed so as to prevent a consonant from being lost. Reference numeral 3 is a reference pattern that is words or sentences of speech of a standard speaker that have been analyzed in the same manner as the analyzing portion 1.

Likewise, the reference pattern 3 is analyzed in such a manner that a speech region is surrounded by noise-regions. The start position and the end position of the noise regions are predetermined and stored. Reference numeral 2 is a preliminary matching portion that determines a time-alignment between the time sequence X(t) of the feature vectors of the input speech and each word-to-be-recognized stored in the reference pattern 3 and matches the time sequence of the feature vectors of the input speech with the time base of each recognized word. This matching technique is a method of for example DP (Dynamic Programming) matching or HMM (Hidden Markov Model) described in reference [2] (pp. 162–170). Reference numeral 4 is a spectral transforming portion that transforms the time sequence X(t) of the feature vectors of the input speech and the time sequence Y(t) of the feature vectors of the reference pattern into time sequences V(t) and W(t) of spectra, respectively. The cepstrums are transformed into the spectra by the following equations.

$$\begin{cases} V(t) = \exp(C^{-1}X(t)) \\ W(t) = \exp(C^{-1}X(t)) \end{cases} \quad (1)$$

Their inverse transformation is given by the following equations.

$$\begin{cases} X(t) = C \log(V(t)) \\ Y(t) = C \log(W(t)) \end{cases} \quad (2)$$

where C represents a cosine transformation matrix; exp(.) represents an exponential operation for each input element; and log(.) represents a logarithmic operation for each input element. When input speech is deformed by additive noise and channel distortion, the additive noise is expressed in the form of a sum on a spectrum and the channel distortion is expressed in the form of a product on a spectrum. When the additive noise of the input speech is denoted by $B_v$, the channel distortion thereof is denoted by $A_v$, and the spectrum of the undegraded speech is denoted by $$\hat{V}(t)$$

then, the following relation is obtained.

$$\begin{cases} V(t) = A_v \hat{V}(t) + B_v & t \in \Omega_v \\ V(t) = B_v & t \in \Phi_v \end{cases} \quad (3)$$

where $\Omega_v$ represents a set of times (speech regions) in which speech is contained; and $\Phi_v$ represents a set of times (noise regions) in which speech is not contained. Since the correlation of channels in the spectral domain is low, Av becomes a diagonal matrix that does not contains a rotation. Thus, the operations are performed for each channel.

When the additive noise of the reference pattern is denoted by Bω; the channel distortion thereof is denoted by Aω; and the spectrum of the undegraded speech is denoted by $$\hat{W}(t)$$

Thus, the following equations can be obtained.

$$\begin{cases} W(t) = A_\omega \hat{W}(t) + B_\omega & t \in \Omega_\omega \\ W(t) = B_\omega & t \in \Phi_\omega \end{cases} \quad (4)$$

where $\Omega_v$ represents a set of times (speech regions) in which speech is contained; and $\Phi_v$ represents a set of times (noise regions) in which speech is not contained. Since the additive noise and the channel distortion of the spectrum of the input speech is different from those of the reference pattern, a matching error of the speech recognition takes place, thereby lowering the recognition ratio.

According to the present invention, the average value of the spectra of the noise regions and speech regions of each of the input speech and the reference pattern is used. The additive noise and the channel distortion of the input speech is matched with those of the reference pattern. Thus, the input speech on the reference pattern are compensated so that the average value of the input speech becomes equal to that of the reference pattern. Such a compensation can be performed for the input speech or the reference pattern.

Next, the compensation for the reference pattern will be described. When the average spectrum of a portion corresponding to the speech region of the reference pattern correlated by the preliminary matching portion 2 in the input speech spectrum is denoted by $S_v$, and an average spectrum of a portion corresponding to the noise region thereof is denoted by $N_v$, they can be expressed by the following equations.

$$\begin{cases} S_v = \frac{1}{K_\Omega} \sum_{t \in \Omega} V(t) \\ N_v = \frac{1}{K_\Phi} \sum_{t \in \Phi} V(t) \end{cases} \quad (5)$$

where $\Omega$ represents a set of times corresponding to the speech region of the reference pattern; $\phi$ represents a set of times corresponding to the noise region of the reference pattern; $K_\Omega$ represents the number of portions corresponding to the speech region; and $K_\Phi$ represents the number of portions corresponding to the noise region. In this example, the summational average has been used. However, the productive average may be used. When the average spectrum of the speech region of the reference pattern is denoted by $S_\omega$ and the average spectrum of the noise region thereof is denoted by $N_\omega$, they can be expressed by the following equations.

$$\begin{cases} S_\omega = \frac{1}{K_{\Omega_\omega}} \sum_{t \in \Omega_\omega} W(t) \\ N_\omega = \frac{1}{K_{\Phi_\omega}} \sum_{t \in \Phi_\omega} W(t) \end{cases} \quad (6)$$

where $K_{\Omega_\omega}$ represents the number of frames of the speech region; and $K_{\Phi_\omega}$ represents the number of frames of the noise region. For such average vectors, the productive average may be used.

When the average vectors of the input speech and the reference pattern are calculated by applying the equations (3) and (4), the following equations can be obtained.

$$\begin{cases} \frac{1}{K_{\Omega_v}} \sum_{t \in \Omega_v} V(t) = \frac{1}{K_{\Omega_v}} \sum_{t \in \Omega_v} A_v \hat{V}(t) + \frac{1}{K_{\Omega_v}} \sum_{t \in \Omega_v} B_v \\ \frac{1}{K_{\Phi_v}} \sum_{t \in \Phi_v} V(t) = \frac{1}{K_{\Phi_v}} \sum_{t \in \Phi_v} B_v \end{cases} \quad (7)$$

-continued $$\begin{cases} \frac{1}{K_{\Omega_\omega}} \sum_{t \in \Omega_\omega} W(t) = \frac{1}{K_{\Omega_\omega}} \sum_{t \in \Omega_\omega} A_\omega \hat{W}(t) + \frac{1}{K_{\Omega_\omega}} \sum_{t \in \Omega_\omega} B_\omega \\ \frac{1}{K_{\Phi_\omega}} \sum_{t \in \Phi_\omega} W(t) = \frac{1}{K_{\Phi_\omega}} \sum_{t \in \Phi_\omega} B_\omega \end{cases} \quad (8)$$

where $K_{\Omega v}$, $K_{101\ v}$, $K_{106\ \omega}$, and $K_{101\ \omega}$ are the number of frames of the respective regions. When $\Omega$ and $\Phi$ are obtained with properly higher accuracies, the following equations can be approximately obtained from the equations (5) and (7).

$$\begin{cases} A_v = \dfrac{S_v - N_v}{\dfrac{1}{K_{\Omega_v}} \sum_{t \in \omega_v} \hat{V}(t)} \\ B_v = N_v \end{cases} \quad (9)$$

where the division for each vector is performed for each channel component and $A_v$ represents an operation for a diagonal component.

Likewise, with the equations (6) and (8), the following approximations can be approximately obtained.

$$\begin{cases} A_\omega = \dfrac{S_\omega - N_\omega}{\dfrac{1}{K_{\Omega_\omega}} \sum_{t \in \Omega_\omega} \hat{W}(t)} \\ B_\omega = N_\omega \end{cases} \quad (10)$$

With A and B obtained in the equations (9) and (10), to match the noise environment due to the additive noise and the channel distortion of the reference pattern with that of the new input speech, the noise region of the reference pattern is substituted with the noise of the input speech and the speech region of the reference pattern is obtained by multiplexing the spectrum of the undegraded speech by the channel distortion of the input speech and adding the result with the noise of the input speech. In other words, the noise region of the reference pattern is given by the following equation.

$$\hat{W}(t) = B_v \quad (11)$$
$$= N_v \ t \in \Phi_v$$

The spectrum of the speech region of the reference pattern is given by the following equation.

$$\hat{W}(t) = A_v \hat{W}(t) + N_v \quad (12)$$

$$= \frac{A_v}{A_\omega}(W(t) - N_\omega) + N_v$$

$$= \frac{S_v - N_v}{S_\omega - N\omega} \frac{\dfrac{1}{K_{\Omega_\omega}} \sum_{t \in \Omega_\omega} \hat{W}(t)}{\dfrac{1}{K_{\Omega_\omega}} \sum_{t \in \Omega_\omega} \hat{V}(t)} (W(t) - N_\omega) + N_v$$

$$= \frac{S_v - N_v}{S_\omega - N_\omega} \frac{\hat{W}}{\hat{V}} (\hat{W}(t) - N_\omega) + N_v \ t \in$$

where $\hat{W}$, and $\hat{V}$ represents the average values of the speech regions (in which noise is not mixed) of the undegraded spectra of the reference pattern and the input speech, respectively.

When it is assumed that the speech of the input speech is a word that is the same as that of the reference pattern, the equation (12) can be expressed by the following equation.

$$\hat{W}(t) = \frac{S_v - N_v}{S_\omega - N_\omega}(W(t) - N_\omega) + N_v \ t \in \Omega_\omega \quad (13)$$

In other words, the compensating portion 6 matches the additive noise and the channel distortion of the input speech with those of the reference pattern corresponding to the equations (11) and (13). In this example, operations have been performed for the reference pattern. However, such operations may be performed for the input speech. In addition, predetermined additive noise may be added to one of the reference pattern and the input speech so that the average value of the reference pattern becomes equal to that of the input speech. Moreover, one of the reference pattern and the input speech may be multiplied by a predetermined channel distortion component so that the average value of the reference pattern becomes equal to that of the input speech. When the compensation is performed corresponding to the equations (11) and (13), the average spectrum of the noise region and the speech region of the reference pattern becomes equal respectively to the average spectrum of the input speech.

The feature vector transforming portion 7 performs a transformation expressed by the equation (2), that is, transforms a spectrum into a cepstrum. In addition to the cepstrum, power information of the input speech, the differential information of the power, the linear repression coefficient of the cepstrum, and so forth may be additionally used. The matching portion 8 determines a time-alignment between each word-to-the recognized of the reference pattern and the input speech using the feature vector transformed by the feature vector transforming portion 7 and outputs as a recognition result a word with the highest similarity.

In other words, according to the present invention, since the noise conditions of the additive noise and the channel distortion of recognized input speech and those of the reference pattern is quickly matched, even if the additive noise and the microphone and transmission channel, through which the input speech is collected, are unknown when the input speech is trained and are different or vary for each input speech, the speech recognition apparatus according to the present invention can precisely recognize speech without influenced by the noise environment while the input speech are in. Thus, the speech recognition apparatus of the present invention solves the drawbacks that the conventional ones have had.

Next, with reference to the accompanying drawings, embodiments of the present invention will be described.

FIG. 1 is a block diagram showing a speech recognition apparatus according to a first embodiment of the present invention. The speech recognition apparatus comprises an analyzing portion 1, a reference pattern 3, a preliminary matching portion 2, a spectrum transforming portion 4, an average vector calculating portion 5, a compensating portion 6, a feature vector transforming portion 7, and a matching portion 8.

The analyzing portion 1 transforms input speech into a time sequence of feature vectors. The reference pattern 3 has a noise region and a speech region into which training speech has been transformed as a time sequence of feature vectors.

The preliminary matching portion 2 matches the time sequence of the feature vectors of the input speech received from the analyzing portion 1 with the time sequence of the feature vectors of the reference pattern.

The spectrum transforming portion 4 transforms the time sequence of the feature vectors of the input speech and the time sequence of the feature vectors of the reference pattern 3 into time sequences of respective spectra.

The average vector calculating portion 5 calculates the average vector of each of the noise region and the speech region of the time sequences of the spectra of the input speech and the reference pattern received from the spectrum transforming portion 4 corresponding to the matching information received from the preliminary matching portion 2.

The compensating portion 6 compensates at least one of the time sequences of the spectra of the input speech and the reference pattern so that the average spectrum of the time sequence of the spectra corresponding to the noise region of the input speech is matched with the average spectrum of the time sequence of the spectra corresponding to the noise region of the reference pattern, and the average spectrum of the time sequence of the spectra corresponding to the speech region of the input speech is matched with the average spectrum of the time sequence of the spectra corresponding to the speech region of the reference pattern.

The feature vector transforming portion 7 transforms the time sequences of the spectra of the input speech and the reference pattern compensated by the compensating portion 6 into time sequences of feature vectors to be recognized. The matching portion 8 finally matches the reference pattern with the input speech using the feature vectors-to-be-recognized of the input speech and the reference pattern and outputs a recognition result.

The input speech containing the additive noise and the channel distortion is transformed into a time sequence of feature vectors by the analyzing portion 1. Examples of the feature vector are power information, a displacement thereof, a cepstrum, and a liner regression coefficient thereof may be contained in the feature vector. Alternatively, the feature vector may be a spectrum itself or a logarithmic spectrum. The analyzing portion 1 analyzes in such a manner that it is surrounded by non-speech portions that contain only surrounding noise in the input speech.

The reference pattern 3 store every recognized regions of words or sentences of speech of a standard speaker that have been analyzed in the same manner as the analyzing portion 1. The reference pattern 3 is analyzed in such a manner that it is surrounded by noise regions. The start position and the end position of each noise region have been determined and stored beforehand.

The preliminary matching portion 2 determines the time-alignment normalizing matching between the time sequence of the feature vectors of the input speech and each word-to-be-recognized stored in the reference pattern 3. Examples of the matching are DP (Dynamic Programming) matching and HMM (Hidden Markov Model), which are described in reference [2] (pp. 162–170).

The spectrum transforming portion 4 transforms the time sequences of the feature vectors of the input speech and the reference pattern into time sequences of respective spectra. If the feature vector is a spectrum, the spectrum transforming portion 4 may be omitted. If the feature vector is composed of a combination of several types of feature vectors, information required for spectrum transformation may be extracted from the feature vector and used.

The average vector calculating portion 5 calculates the average vector of the spectrum of each of the noise region and the speech region divided the input speech and the reference pattern received from the spectrum transforming portion 4.

The compensating portion 6 compensates the average spectra of the input speech and the reference pattern calculated by the average vector calculating portion 5 so that the average value of each of the noise region and the speech region of the input speech becomes equal to each that of the reference pattern. This compensation can be performed for at least one of the input speech and the reference pattern.

The feature vector transforming portion 7 transforms the time sequences of the spectra of the input speech and the reference pattern, which have been compensated by the compensating portion 6, into time sequences of feature vectors-to-be-recognized. Examples of the feature vector is power information, a displacement thereof, a cepstrum, and a linear regression coefficient thereof. In addition, the feature vector may be a combination of power information, a displacement thereof, a cepstrum, and a linear regression coefficient thereof or plural combination thereof. Moreover, the feature vector may be a spectrum itself. Furthermore, the feature vector may be a logarithmic spectrum.

The matching portion 8 calculates the similarity between the time sequences of the feature vectors of the input speech and the reference pattern transformed by the feature vector transforming portion 7 and outputs a recognition result with the highest similarity.

In this example, the compensation for the input speech has been described. However, the additive noise and the channel distortion of input speech are occasionally the same as those of input speech that is generated just after the first input speech.

In this case, the calculation of the average vector and the compensation may be not required whenever input speech is received. For example, the average vector calculating portion 5 and the compensating portion 6 may store parameters for the former speech and compensate the next speech with the parameters being stored. Thus, the speech recognition can be quickly performed and the disposal load of the apparatus is reduced. Alternatively, the compensated reference pattern may be stored for the next speech recognition. In the next speech recognition, the analyzing portion 1 calculates the feature vectors used for the last matching without compensating the reference pattern and matches the reference pattern stored in the matching portion 8 with the input speech.

According to a speech recognition apparatus of a second embodiment of the present invention, the compensating portion 6 substitutes one of time sequences of spectra of the noise region with an average vector Ni of the other noise region, subtracts an average vector Nt of one noise region from the time sequence of the spectra corresponding to the speech region, multiplies the result by (Si—Ni)/(St-Nt) (where / represents a division for each channel of spectra, Si is an average vector of the other speech region, and St represents the average vector of one speech region), and adds the result with Ni. For example, the spectrum of the reference pattern is compensated corresponding to the equations (11) and (13).

Thus, as it clear from the above description, according to the speech recognition apparatus of the present invention, since additive noise and noise conditions of the channel distortion of input speech to be recognized are quickly matched with those of a reference pattern, even if the additive noise and microphone and the transmission channel through which the input speech is collected are unknown when the input speech is trained and the additive noise and the noise conditions vary for each input speech, the speech recognition apparatus can precisely recognize speech without influenced of environmental noise. Thus, the apparatus according to the present invention can solve the drawbacks that the conventional apparatuses have had.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A speech recognition apparatus, comprising:

a speech analyzing portion for transforming a noise region and a speech region of input speech into a time sequence of feature vectors;

a reference pattern stored as a noise region and a speech region of training speech that have been transformed into time sequences of feature vectors;

a preliminary matching portion for matching the time sequence of feature vectors of the noise region and the speech region of the input speech received from said speech analyzing portion with the time sequences of feature vectors of the noise region and the speech region of said reference pattern, respectively, and for outputting matching information;

a spectrum transforming portion for transforming the feature vectors of the noise region and the speech region of the input speech and the feature vectors of the noise region and the speech region of said reference pattern into a time sequence of respective spectra;

an average vector calculating portion for calculating an average vector for each of the noise region and the speech region of the input speech and the noise region and the speech region of said reference pattern corresponding to the matching information received from said preliminary matching portion;

a compensating portion for compensating the average vectors calculated by said average vector calculating portion for at least one of the time sequence of spectra of the input speech and the time sequence of spectra of the reference pattern so that the average vector of the time sequence of spectra of the noise region of the input speech matches with the average vector of the time sequence of spectra of the noise region of said reference pattern and that the average vector of the time sequence of spectra of the speech region of the input speech matches with the average vector of the time sequence of spectra of the speech region of said reference pattern;

a feature vector transforming portion for transforming the average value of the time sequences of spectra of the input speech and said reference pattern, wherein the average vector has been compensated by said compensating portion, into time sequences of feature vectors to be recognized; and a matching portion for finally matching the noise region of the input speech received from said feature vector transforming portion with the noise region of the reference pattern, and for finally matching the speech region of the input speech received from said feature vector transforming portion with the speech region of the reference pattern.

2. The speech recognition apparatus as set forth in claim 1, wherein said compensating portion is adapted for substituting one of the time sequences of spectra corresponding to the noise region of the average vectors calculated by said average vector calculating portion with an average vector Ni of the other noise region, subtracting an average vector Nt of one noise region from time sequences of spectra corresponding to speech regions, multiplying the result by (Si—Ni)/(St-Nt) (where / is a division for each channel of the spectra, Si is an average vector of the other speech region, and St is an average vector of one speech region), and adding the result with the average vector Ni.

3. The speech recognition apparatus as set forth in claim 1, wherein a feature vector of the feature vector transforming portion is one of power information, a displacement thereof, a cepstrum, a linear regression coefficient thereof, and a logarithmic spectrum.

4. The speech recognition apparatus as set forth in claim 1, wherein said preliminary matching portion is performed corresponding to DP matching or HMM (Hidden Markov Model).

5. A speech recognition apparatus, comprising:

a speech analyzing portion for transforming a noise region and a speech region of input speech into feature vectors as a time sequence;

a reference pattern stored as a noise region and a speech region of reference speech that have been transformed into feature vectors as time sequences;

a preliminary matching portion for matching a time base of feature vectors of the noise region and the speech region output from said speech analyzing portion with a time base of feature vectors of the noise region and the speech region of said reference pattern and for outputting matching information;

a spectrum transforming portion for transforming the feature vectors of the noise region and the speech region output from said speech analyzing portion and the feature vectors of the noise region and the speech region of said reference pattern into time sequences of respective spectra and for outputting spectra of the noise region and the speech region of the input speech and spectra of the noise region and the speech region of the reference pattern;

an average vector calculating portion for calculating an average vector of each of the spectra of the noise region and the speech region of each of the input speech and said reference pattern corresponding to the matching information received from said preliminary matching portion and for outputting an average spectrum of the noise region and the speech region of the input speech and an average spectrum of the noise region and the speech region of said reference pattern;

a compensating portion for performing a compensation for at least one of the input speech and said reference pattern corresponding to the matching information received from said preliminary matching portion so that the average spectrum of the input speech matches with the average spectrum of said reference pattern;

a feature vector transforming portion for transforming outputs of said compensating portion into feature vectors-to-be-recognized as time sequences and for outputting a feature vector of the input speech and a feature vector of said reference pattern; and a matching portion for matching the input speech with said reference pattern using the feature vector of the input speech and the feature vector of said reference pattern.

6. The speech recognition apparatus as set forth in claim 5, wherein said compensating portion is adapted for substituting one of time sequences of the spectra corresponding to the noise regions of the average spectra of the input speech and said reference pattern with an average spectrum Ni of the other noise region, subtracting an average spectrum Nt of one noise region from time sequences of spectra corresponding to the speech regions, multiplying the result by (Si—Ni)/(St-Nt) (where / is a division for each channel of the spectra, Si is an average spectrum of the other speech region, and St is an average spectrum of one speech region), and adding the result with the average spectrum Ni.

7. The speech recognition apparatus as set forth in claim 5, wherein a feature vector of said feature vector transforming portion is one of power information, a displacement thereof, a cepstrum, a linear regression coefficient thereof, and a logarithmic spectrum.

8. The speech recognition apparatus as set forth in claim 5, wherein said preliminary matching portion is performed corresponding to one of DP matching and HMM (Hidden Markov Model).

9. The speech recognition apparatus as set forth in claim 5, wherein said matching portion is performed corresponding to a matching technique so as to determine the similarity between the feature vector of the input speech and the feature vector of said reference pattern.

10. A speech recognition apparatus, comprising:

a speech analyzing portion for transforming a noise region and a speech region of input speech into a time sequence of feature vectors;

a reference pattern stored as a noise region and a speech region of training speech that have been transformed into time sequences of feature vectors;

a preliminary matching portion for matching the time sequence of feature vectors of the noise region and the speech region of the input speech received from the speech analyzing portion with the time sequence of feature vectors of the noise region and the speech region of said reference pattern, respectively, and for outputting matching information;

an average vector calculating portion for calculating an average vector of each of the noise region and the speech region of the input speech output from said speech analyzing portion and said reference pattern corresponding to the matching information received from said preliminary matching portion;

a compensating portion for compensating the average vectors calculated by said average vector calculating portion for at least one of the time sequence of feature vectors of the input speech and the time sequence of feature vectors of the reference pattern so that the average vector of the time sequence of feature vectors of the noise region of the input speech matches with the average vector of the time sequence of feature vectors of the noise region of said reference pattern and that the average vector of the time sequence of feature vectors of the speech region of the input speech matches with the average vector of the time sequence of feature vectors of the speech region of said reference pattern; and a matching portion for finally matching said reference pattern with the input speech using feature vectors-to-be-recognized of the input speech and said reference pattern received from said compensating portion.

11. The speech recognition apparatus as set forth in claim 10, wherein said compensating portion is adapted for substituting one of the time sequences of feature vectors corresponding to the noise region of the average vectors calculated by said average vector calculating portion with an average vector Ni of the other noise region, subtracting an average vector Nt of one noise region from time sequences of spectra corresponding to speech regions, multiplying the result by (Si—Ni)/(St-Nt) (where / is a division for each channel of the feature vectors, Si is an average vector of the other speech region, and St is an average vector of one speech region), and adding the result with the average vector Ni.

12. A method of speech recognition, comprising the steps of:

a. storing a reference pattern that has a noise region and a speech region that are feature vectors transformed from reference speech as time sequences;

b. inputting input speech into an analyzing portion so as to transform a noise region and a speech region of the input speech into feature vectors as a time sequence;

c. obtaining a time-alignment between an output of the analyzing portion and the reference pattern so as to output matching information by a preliminary matching portion;

d. transforming the output of the analyzing portion and the output of the reference pattern into time sequences of respective spectra and outputting spectra of the noise region and the speech region of the input speech and spectra of the noise region and the speech region of the reference pattern by a spectrum transforming portion;

e. calculating an average spectrum of the noise region and the speech region of the input speech and an average spectrum of the spectra of the noise region and the speech region of the reference pattern corresponding to the matching information received from the preliminary matching portion and outputting the average spectrum of the noise region and the speech region of the input speech and the average spectrum of the noise region and the speech region of the reference pattern by an average vector calculating portion;

f. performing a compensation for at least one of the input speech and the reference pattern corresponding to the matching information received from the preliminary matching portion so that the average spectrum of the noise region and the speech region of the input speech matches with the average spectrum of the noise region and the speech region of the reference pattern by a compensating portion;

g. transforming outputs of the compensating portion into feature vectors to be recognized as time sequences and outputting a feature vector of the input speech and a feature vector of the reference pattern by a feature vector transforming portion; and h. matching the feature vector of the input speech with the feature vector of the reference pattern so as to detect a speech recognition result by a matching portion.

13. The method as set forth in claim 12, wherein said step (f) is performed by substituting one of time sequences of spectra corresponding to the noise regions of the input speech and the reference pattern with an average spectrum Ni of the other noise region, subtracting an average spectrum Nt of one noise region from time sequences of spectra corresponding to the speech region, multiplying the result by (Si—Ni)/(St-Nt) (where / is a division for each channel of the spectra, Si is an average spectrum of the other speech region, and Si is an average spectrum of one speech region), and adding the result with the average spectrum Ni.

14. A method of speech recognition, comprising the steps of:

a. storing a reference pattern that has a noise region and a speech region that are feature vectors transformed from reference speech as time sequences;

b. inputting input speech into an analyzing portion so as to transform a noise region and a speech region of the input speech into feature vectors as a time sequence;

c. obtaining a time-alignment between an output of the analyzing portion and the reference pattern so as to output matching information by a preliminary matching portion;

d. calculating an average vector of the feature vectors of the noise region and the speech region of the input speech and an average vector of the feature vectors of the noise region and the speech region of the reference pattern corresponding to the matching information received from the preliminary matching portion and outputting the average vector of the noise region and the speech region of the input speech and the average vector of the noise region and the speech region of the reference pattern by an average vector calculating portion;

e. performing a compensation for at least one of the noise region and the speech region of the input speech and the noise region and the speech region of the reference pattern corresponding to the matching information received from the preliminary matching portion so that the average vector of the input speech matches with the average vector of the reference pattern by a compensating portion; and f. matching the feature vectors of the noise region and the speech region of the input speech with the feature vectors of the noise region and the speech region of the reference pattern so as to detect a speech recognition result by a matching portion.

15. The method as set forth in claim 14, wherein said step (e) is performed by substituting one of the time sequences of feature vectors corresponding to the noise regions of the input speech and the reference pattern with an average vector Ni of the other noise region, subtracting an average vector Nt of one noise region from the time sequences of feature vectors corresponding to the speech region, multiplying the result by (Si—Ni)/(St-Nt) (where / is a division for each channel of the feature vectors, Si is an average vector of the other speech region, and Si is an average vector of one speech region), and adding the result with the average vector Ni.

* * * * *